US011269970B2

(12) United States Patent
Raymond

(10) Patent No.: US 11,269,970 B2
(45) Date of Patent: *Mar. 8, 2022

(54) SYSTEM AND METHOD OF CREATING AND PROCESSING SEMANTIC URL

(71) Applicant: Bootstrap Collective LLC, Stamford, CT (US)

(72) Inventor: Steve Raymond, Stamford, CT (US)

(73) Assignee: Bootstrap Collective LLC, Stamford, CT (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/558,980

(22) Filed: Sep. 3, 2019

(65) Prior Publication Data

US 2019/0392015 A1    Dec. 26, 2019

Related U.S. Application Data

(63) Continuation of application No. 15/169,192, filed on May 31, 2016, now Pat. No. 10,445,393.

(51) Int. Cl.
*G06F 16/958* (2019.01)
*G06F 16/955* (2019.01)

(52) U.S. Cl.
CPC ................ *G06F 16/9566* (2019.01)

(58) Field of Classification Search
CPC .................................................. G06F 16/9566
See application file for complete search history.

(56) References Cited

U.S. PATENT DOCUMENTS

| 7,062,475 | B1 | 6/2006 | Szabo et al. |
|---|---|---|---|
| 7,325,192 | B1 | 1/2008 | Bialek et al. |
| 2007/0250705 | A1 | 10/2007 | Smith et al. |
| 2010/0268720 | A1 | 10/2010 | Spivack et al. |
| 2011/0078554 | A1 | 3/2011 | Nie et al. |
| 2011/0264992 | A1 | 10/2011 | Vishria et al. |
| 2012/0271941 | A1 | 10/2012 | Mirandette et al. |
| 2015/0154012 | A1 | 6/2015 | Wolfram |
| 2015/0242529 | A1* | 8/2015 | Kinger ............... G06F 16/9566 707/770 |

* cited by examiner

*Primary Examiner* — Tarek Chbouki
(74) *Attorney, Agent, or Firm* — The Webb Law Firm

(57) ABSTRACT

The present invention is directed to a method and computer readable medium for automatically generating a Uniform Resource Locator (URL) from schema and semantics of an organizational structure. The semantically intelligent URL conveys knowledge about content it accompanies by defining patterns of possible URL parameters within an organizational structure of related content stored in a database, each pattern being represented by entities and semantic information formed of attributes and relationships. The patterns of the URL organize categories of information and form relationships among the entities. The patterns are used for automatically generating a URL along with semantic information about the content in a resource or web page, wherein said semantic information explains the content, such as with attributes of entities, such as in a name value pair that correlates to the content of a page.

14 Claims, 13 Drawing Sheets

| | Schema | Component | Related Schema | Related Component | (No column name) |
|---|---|---|---|---|---|
| 1 | araa | Activity | gss | Genre | 6 |
| 2 | araa | Activity | gss | Season | 808 |
| 3 | araa | Activity | gss | Species | 528 |
| 4 | araa | Region | gss | Genre | 54 |
| 5 | araa | Region | gss | Season | 780 |
| 6 | araa | Region | gss | Species | 1697 |
| 7 | gss | Genre | gss | Species | 539 |
| 8 | gss | Season | gss | Species | 905 |

FIG. 7

SYSTEM AND METHOD OF CREATING AND PROCESSING SEMANTIC URL

CROSS REFERENCE TO RELATED APPLICATION

This application is a continuation of U.S. patent application Ser. No. 15/169,192, filed May 31, 2016, which was published as U.S. Patent Application Publication No. 2017/0344655 on Nov. 30, 2017, the disclosure of which is herein incorporated by reference in its entirety.

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The invention relates to providing semantic information in a URL for accessing data, optimizing search engine, and providing organizational data in a structure for automatically creating sematic information for the World Wide Web (WWW).

Description of Related Art

A need exists for URLs that are descriptive of page content, easily discernible, and that operate within web crawler parameters. The majority of web traffic is driven by the major commercial search engines, such as Google and Bing. Although social media has become a popular generator of visits to a website, search engines remain the primary method of navigation for most Internet users today who are using websites that provide content, services, products, or information.

Among other things, search engines provide targeted traffic and help people find what they are looking for. Search engines can also help websites draw users by creating interest for what they offer. They make this happen by finding websites and adding content about the websites to their databases, which in turn can drive traffic to a website.

One of the problems with search engines is that they have a limited number of positions on a search results page. The results that fill those positions are ordered by a rank algorithm. Top results on a search results page relate proportionately to the relevance of the page to the key words and its ability to attract searchers. As a result, the top positions on a first page of search results receive much more traffic than results lower down the page and considerably more results than subsequent pages. The fact that great attention is given to so few results means that there will always be a financial incentive for search engine rankings. Websites and businesses compete with one another for search engine attention and for the user traffic and brand visibility prominence search results can provide.

When a person performs an online search, the search engine scours its corpus of documents (billions of them) and returns only those results that are relevant and/or useful to a searcher's query. Additionally, results are ranked according to the popularity of the websites serving the information. The process of search engine optimization is meant to influence both relevance and popularity. One of the problems with search engines is that, usually, users do not take the time to scour the results. It is common practice for Internet users to not click through pages and pages of search results. Therefore, where a site ranks in a search is essential for directing more traffic toward that site.

Search Engine Optimization (SEO) attempts to increase the number of visitors to a website by adjusting characteristics for the website to increase ranking level in the search results of a search engine. The higher a website ranks in the results of a search, the greater the chance that the site will be visited by a user. Therefore, much attention is given to increasing ranking of web pages.

SEO helps to increase accessibility of a website to a search engine and improves the chances that the site will be found by the search engine. Keywords (words entered by users that the search engine uses to perform a search) associated with websites, web pages, and URLs (Uniform Resource Locators) of web pages are an important part of SEO. However, many websites and web pages do not make use of the keywords entered by their users in a very efficient and optimized manner to increase relevant traffic to the website.

Experience has shown that search engine traffic can make (or break) an organization's success. Search engines provide results through the use of search queries, which are the words that users type into a search engine search box to initiate a search. Search queries carry extraordinary value. Targeted traffic to a website can provide publicity, revenue, and exposure like no other channel of marketing. It is common for companies to invest in SEO for marketing and promotion purposes.

However, targeting traffic can be difficult because, often, little is known about how the algorithms of search engines operate. Search engine companies keep the algorithms secret and often provide little insight into how to achieve better results or garner more traffic.

For example, Google recommends making pages primarily for users, not for search engines. Some websites are designed to present different pages to users than those that are presented to search engines, a practice commonly referred to as "cloaking." Google emphasizes transparency, encouraging websites to present to users the same content that is presented to and used by search engines to determine relevancy and rank.

Through methods like patent analysis, experiments, and live testing, search marketers as a community have come to understand many of the basic operations of search engines and the critical components of creating websites and pages that earn high rankings and significant traffic. Poor link structures may make a site unreachable. If a website's link structure is not understandable to search engines, they may not reach all of the website's content, or the minimally-exposed content may be deemed unimportant by the search engine's index.

For example, mixed contextual signals and mixed messages send confusing signals to search engines. If the title of your blog post is "Nebraska's Best Hunting", but the post itself is about a vacation resort in Canada, which happens to have a hunting museum that provides information regarding hunting in Nebraska, it sends a confusing message. Many websites lack hierarchy and text links that make every page reachable from at least one static text link.

However, even creating a useful, information-rich site that clearly and accurately describes your content does not guarantee search engine results will be perfect. Websites increasingly make elements and attributes search engine friendly, such as <title> elements and ALT (alternative) attributes that are descriptive and accurate. Keywords are used to create descriptive, human-friendly URLs and provide one version of a URL to reach a document using 301 redirects or the rel="canonical" attribute to address duplicate content. URLs are commonly used as text-based addresses to identify Internet resources (e.g., web pages). It may be advantageous to identify an Internet resource that may be easily remembered by a user and easily found through search engines. Because a URL may comprise additional information used by the Internet resource, the URL may become complex and difficult to discover through searches. URL rewriting is a common technique which allows users to interact with an Internet resource using a simple URL. A user may enter a simple URL that is then rewritten to a URL comprising more complex and useful information for the Internet resource (e.g., information concerning the web browser requesting the URL). Another technique used to enhance a user's experience with Internet resources is caching, which is a technique that allows a URL and/or Internet data to be stored for quick access.

Links and hyperlinks are the original navigational elements of the Internet.

Example 1

<a href="http://www.jonwye.com">Jon Wye's Custom Designed Belts</a>

In the above example, the link tag "<a" indicates the start of a link. The link referral location tells the browser and the search engines where the link points (above the URL http://www.jonwye.com is referenced). Next, the visible portion of the link for visitors, called anchor text in the SEO world, describes the page the link points to. In this example, the linked-to page contains information concerning custom belts made by Jon Wye, thus the anchor text, "Jon Wye's Custom Designed Belts." The "</a>" tag closes the link to constrain the linked text between the tags and to prevent the link from encompassing other elements on the page. As shown, the link tags can contain images, text, or other objects and provide a clickable area on the page that users can engage to request a move to another page.

URLs are used in ranking documents. Links and hyperlinks are URLs, the addresses for documents on the web. Not only are they important in terms of SEO, but since they show up on SEO results, they are also prominently displayed to users. Since search engines display URLs in the search results, they can impact click-through and visibility. Search engines can pick up ranking signals from elements of the underlying code that is used by search engines to understand the details of the page content and structure.

Attempts to increase ranking can often fail. For ranking documents, web pages whose names include queried search terms receive some benefit from a proper, descriptive use of keywords. URLs appear in the web browser's address bar.

One way to increase rank is to use URLs. If an appropriately descriptive URL can easily and accurately predict the content a user would expect to find on a web page, that URL will rank higher in the search results. While a descriptive URL is important, minimizing length and trailing slashes make URLs easier to copy and paste (into emails, blog posts, text messages, etc.) and display fully in a search engine's search results. If the user's page is targeting a specific term or phrase, the user should be sure to include it in the URL. Unfortunately, some websites artificially load URLs with multiple keywords and without many parameters, numbers, and/or symbols for SEO purposes and an overuse that results in fewer usable URLs, from both a search engine and a user standpoint.

Another difficulty with URLs are all the symbols being used. Not all web applications accurately interpret separators like underscores (_) plus signs (+), or spaces (%20), and instead use the hyphen character (-) to separate words in a URL, as in the "google-fresh-factor" URL example above.

Using technologies like mod_rewrite for Apache and ISAPI_rewrite for Microsoft, a user can easily transform dynamic URLs. The mod_rewrite module uses a rule-based rewriting engine based on a PCRE regular-expression parser to rewrite requested URLs on the fly. By default, mod_rewrite maps a URL to a filesystem path. However, it can also be used to redirect one URL to another URL or to invoke an internal proxy fetch. ISAPI_rewrite provides a rule-based rewriting engine to rewrite requested URLs on the fly. It supports a large number of rules and conditions to provide an incredibly flexible and powerful URL manipulation mechanism. The URL manipulations can depend on tests for HTTP headers, server variables, request-URI, and method and version information of a client request. Even single dynamic parameters in a URL can result in lower overall ranking and indexing.

A blog might have a URL that encodes the dates of each entry:
http://www.example.com/Blog/Posts.php?Year=2006&Month=12&Day=19
It can be altered like this:
http://www.example.com/Blog/2006/12/19/
However, these types of rewrites are superficial, simple rule based manipulations to alter a URL that have no relation to how content is organized on the server side.

It would be preferable to utilize conventional, all-purpose search engines to increase rankings of the desired content in databases on the web and make a URL that is based on the host's organizational structure of the data in the web page. Thus, it would be preferable to provide a way for website operators to make their database content accessible and searchable using conventional search engines and web crawlers. It is further desirable to enable users to search database content directly from a browser when the user already knows one or more database driven websites that likely contain relevant information.

SUMMARY OF THE INVENTION

The present invention is directed to a system and method for automatically generating a Uniform Resource Locator (URL) from schema and semantics of an organizational structure.

Various objects, features, aspects, and advantages of the present invention will become more apparent from the following detailed description of preferred embodiments of the invention, along with the accompanying drawings in which like numerals represent like components.

In preferred embodiments, a method and system are provided for generating an intelligent Uniform Resource Locator (URL) from schema and semantics of an organizational structure. In another preferred embodiment, the intelligent URL comprises defining patterns of possible URL parameters within an organizational structure of related content stored in a database, each pattern being represented by entities, attributes, and relationships. The attributes organize categories of information and form relationships among the entities. In another preferred embodiment, the patterns are used for automatically generating a URL using said patterns to arrange the entities and attributes of the schema to form a URL with semantic information about the content in a web page, wherein said semantic information explains relationships between entities, as well as relationships between entity and attributes of the entity, and wherein the semantic parameter is at least one name value pair and correlates to the content of a page.

In another preferred embodiment of the intelligent URL, possible URL patterns are formed of attributes of associated data mappings, associating representations of items in a database, using the relationships between them, programming instructions for associating elements together, or file structures, comprising one or more types of structure. In another preferred embodiment of the intelligent URL, a URL of the method further comprises a relational attribute that indicates a hierarchical location of the dynamically accessed data from among a plurality of sources of data stored in the database. The method can further comprise automatically mapping when a client requests a page with parameters not previously mapped by using relationships in the database. This provides horizontal links that permit different elements of the organizational structure to cooperate, whilst individually optimizing different success criteria.

In another preferred embodiment, a computer-implemented method is provided for generating an indexable Uniform Resource Locator (URL) from schema and semantics of an organizational structure. In another preferred embodiment, the intelligent URL is used for defining patterns of possible URL parameters within the organizational structure of related content stored in a database, each pattern represented by entities, attributes, and relationships, the attributes organizing categories of information and forming relationships among the entities. In another preferred embodiment of the intelligent URL, a URL is automatically generated by using said patterns to arrange the entities and attributes of the schema to form a URL with semantic information about the content in a web page, wherein said semantic information explains relationships between entities, as well as relationships between entity and attributes of the entity, wherein the semantic parameter is at least one name value pair and correlates to the content of a page.

In another preferred embodiment of the intelligent URL, a web crawler program activates the generated URL, causing a page request from an Internet content provider and a response to the page request, including a page that matches the content in the generated URL.

In another preferred embodiment, the intelligent URL system and method comprise the semantic language, indicating an area of subject matter to be searched and accessed from among the data associated with the relational attribute in the database, the subject matter corresponding to the semantic language of the specified URL entered by the user. The system can use the relational attribute to indicate a level for corresponding semantic data.

In another preferred embodiment of the intelligent URL, a system for automatically generating a Uniform Resource Locator (URL) from schema and semantics of an organizational structure is provided. The system defines patterns of possible URL parameters within an organizational structure of related content stored in a database, each pattern represented by entities, attributes, and relationships, with the attributes organizing categories of information and forming relationships among the entities. The system automatically generates a URL and uses patterns to arrange the entities and attributes of the schema to form a URL with semantic information about the content in a web page, wherein said semantic information explains relationships between entities and relationships between entity and attributes of the entity, and wherein the semantic parameter is at least one name value pair and correlates to the content of a page.

In another preferred embodiment of the intelligent URL, a computer readable medium has computer executable instructions thereon for automatically generating a Uniform Resource Locator (URL) from schema and semantics of an organizational structure, said computer executable instructions thereon comprising computer executable instructions. The system and method defines a pattern of a possible URL parameter within the organizational structure of related content, the pattern represented by relational attributes of a schema that organize categories of information and the relationships among them. The system automatically generates the URL comprising the relational attributes of the schema and semantic information about the relational attributes.

In another preferred embodiment of the intelligent URL, a system comprises one or more computers and one or more storage devices storing instructions that, when executed by the one or more computers, cause the one or more computers to perform operations. The system can be used for determining, for each hub, respective components, wherein the components are used for filtration and based on a selection of relational attributes within a vertical. The system can be used for determining, for each spoke component, an explicit relationship with an associated hub component, wherein relevant semantic information from a Uniform Resource Locator (URL) is used to determine topic(s). In another preferred embodiment, the intelligent URL relates relevant (single or multiple) spoke component data using a mapping table. In another preferred embodiment, the intelligent URL calculates a modified set of semantic attributes with potential of increasing or decreasing the complexity of a Uniform Resource Locator (URL) semantic information. In another preferred embodiment, the intelligent URL offers more specific choices of URLs for limiting scope of filtered content. In another preferred embodiment, the intelligent URL offered less specific choices of URLs for broadening scope of filtered content and offering similarly specific choices of URLs with different but related semantic attributes for changing scope of filtered content.

In another preferred embodiment, the intelligent URL provides a method for requesting dynamically accessed data stored in a database using a Uniform Resource Locator (URL). In another preferred embodiment, the intelligent URL receives a specified URL into an address data field of an application, the URL comprising at least one semantic information subfield of know-how about the stored data, and indicates limits on the scope of the dynamically accessed data. In another preferred embodiment, the intelligent URL transmits requested updates to the data by changing at least one subfield in the address data field to include new semantic information and receives updated dynamically accessed data in response to changes in the semantic information.

In another preferred embodiment of the intelligent URL, changes comprise updating a previously received subfield, deleting a previously received subfield, and/or adding a new subfield. In another preferred embodiment of the intelligent URL, the URL can be used to filter the dynamically accessed data for return to the requester and comprises relational attributes and semantic language. In another preferred embodiment, the intelligent URL further indicates using semantic information, an update to the data store. In another preferred embodiment of the intelligent URL, the URL further comprises a relational attribute that indicates a hierarchical location of the dynamically accessed data from among a plurality of sources of data stored in the database.

In another preferred embodiment of the intelligent URL, the relational attribute comprises a pattern of a possible URL parameter within the organizational structure of the data, the pattern representing categories of information and the relationships among them. In another preferred embodiment of the intelligent URL, the semantic language indicates an area of subject matter to be searched and accessed from among the data associated with the relational attribute in the database, the subject matter corresponding to the semantic language of the specified URL entered by the user. In another preferred embodiment, the intelligent URL uses the relational attribute to indicate a level for corresponding semantic data.

BRIEF DESCRIPTION OF THE DRAWINGS

FIG. 7 illustrates a database entry for the data logic model.

DESCRIPTION OF THE INVENTION

Figure 1:
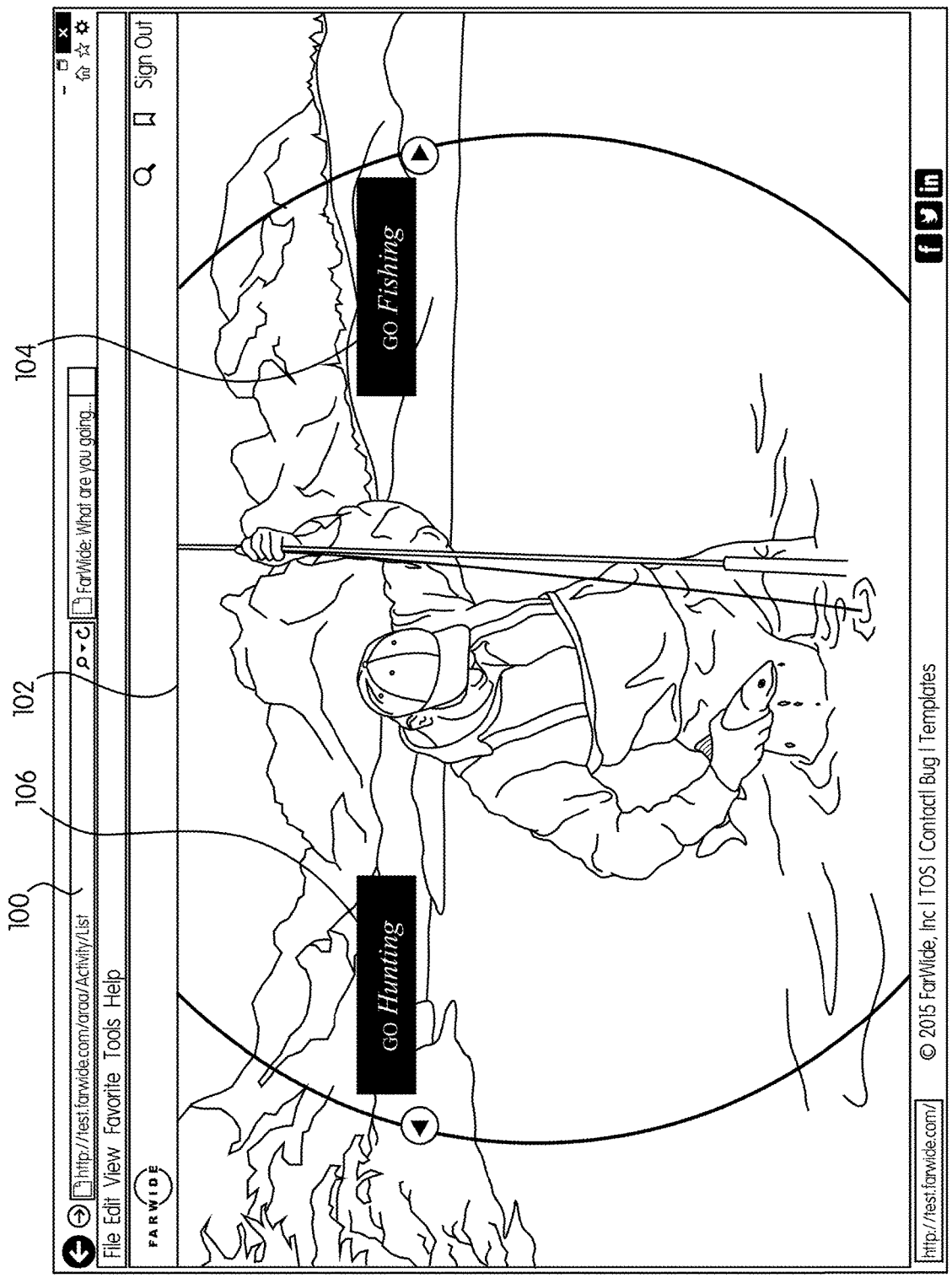
FIG. 1 illustrates a user interface according to an embodiment of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous other arrangements are possible.

Figure 2:
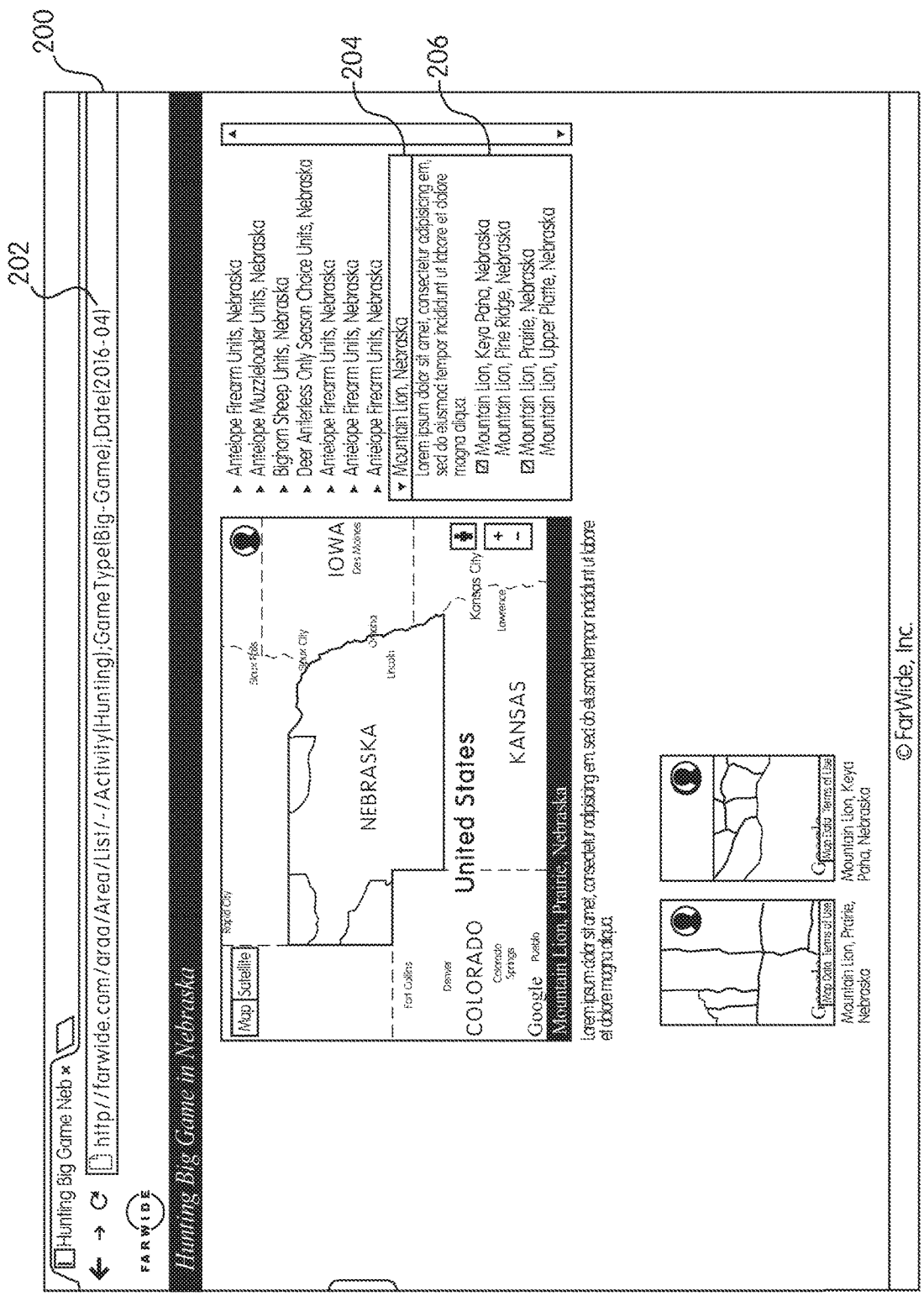
FIG. 2 illustrates a user interface according to an embodiment of the present invention.
Figure 3:
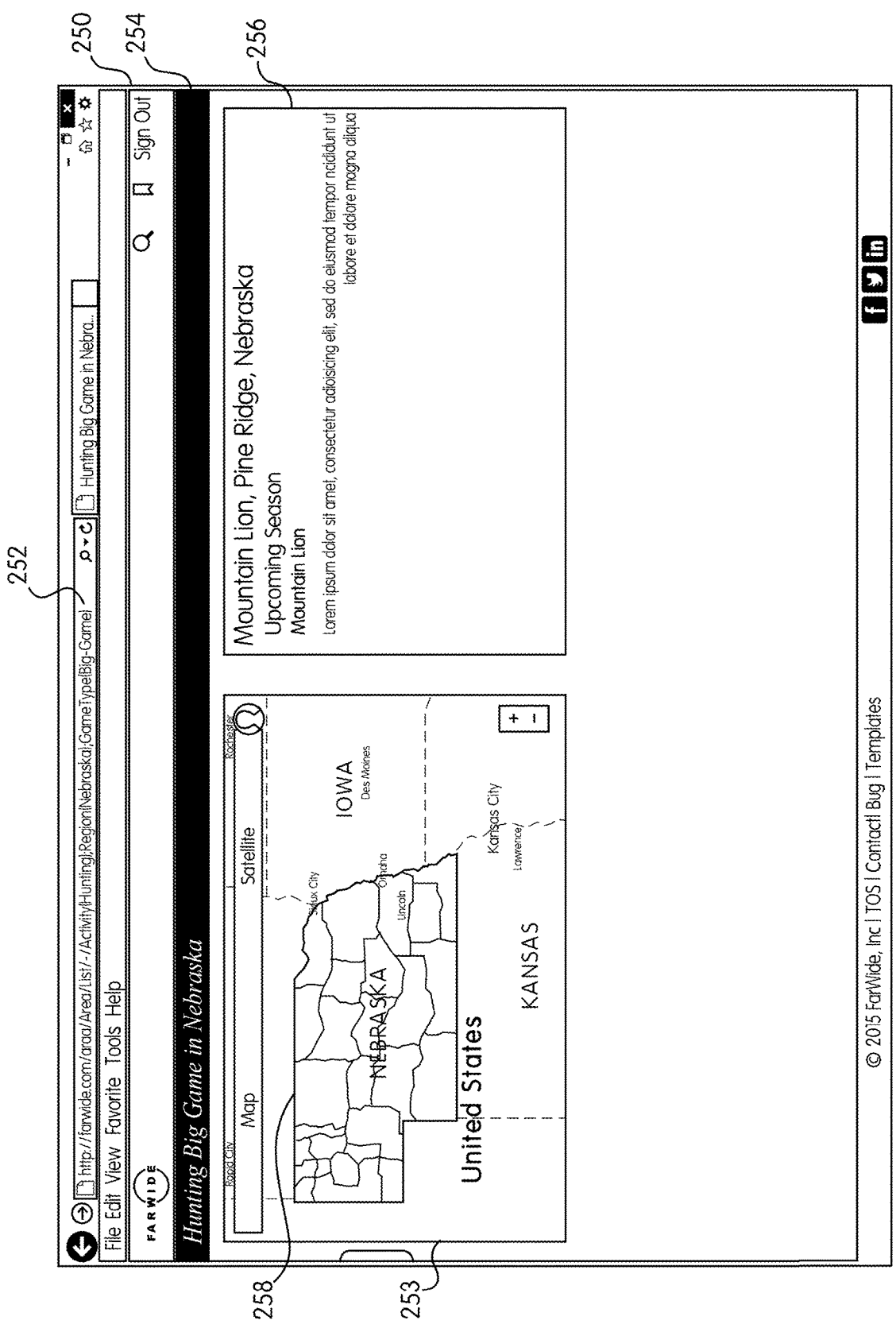
FIG. 3 illustrates a user interface according to an embodiment of the present invention.

FIGS. 1-3 are groups of web pages rendered by a web browser for display by a personal computer. The pages are associated with URLs that are semantic and store organization context about the server where the pages and URL are created. The pages are used for listing activities, in this case hunting and fishing, to display selectable choices on a user's computer or mobile device. With specific reference to FIG. 1, a displayed web page 102 includes selectable buttons, a fishing button 104, and a hunting button 106, which a user can change or activate for selecting a vertical from multiple vertical selections. In this example, a vertical is an outdoor sportsman activity.

A vertical is an offering of goods and/or services specific to an industry, trade, profession, or other group of customers with specialized needs. In a preferred and non-limiting embodiment, particular verticals are related to outdoor activities, more specifically, hunting and fishing as shown on buttons 104 and 106, respectively. In the webpage model, top level pages are vertical in nature, but the logical arrangement of items is not limited to only hierarchical representations or web pages as those of skill in the art will recognize that other types of arrangements, such as diagonal or horizontal, or combinations would also be suitable for representation of web pages, or other applications on the Internet. The buttons are a gateway to the specific areas of activity, acting to guide the client. Other examples are specialized ecommerce vendors or service providers, such as hotels, where particular software is used to manage services and amenities.

With reference to FIG. 2, a web page 200 is created and returned from a server when a user clicks on a hyperlink or a number of selectable options to create a hyperlink in the hunting and fishing web page 102 of FIG. 1. A user enters the portal and eventually displays the page 200 by selecting from a group of options or selectable choices. The URL http://farwide.com/araa/Area/List/-/Activity(Hunting); GameType(Big-Game); Date(2016-04) is the address for the page 200.

When the user is viewing the page 102, or pages related to it, selectable options can be made by a user or web crawler which result in the user requesting the page shown in FIG. 2. Web pages are linked together by URI, or hyperlinks. The hyperlinks are returned to the server and invoke programming code and processing to create alternate and secondary pages. One of ordinary skill in the art would recognize other variations, modifications, and alternatives exist to the arrangement of pages. For example, any number of intermediate pages can be programmed to exist between the pages of FIGS. 1-3.

With reference to FIG. 3, a web page 250 is created in response to clicking a hyperlink from a page such as 200 of FIG. 2. The URL of page 250 is displayed to the user in the address bar 252, shown here as http://farwide.com/araa/ Area/List/-/Activity(Hunting);Region(Nebraska);Game-Type(Big-Game). The same URL could also be written with other attributes such as, http://farwide.com/araa/Area/List/-/ Activity(Hunting,Fishing);Region(Nebraska);GameType (Big-Game) or http://farwide.com/araa/Area/List/-/Activity (Hunting);Region(Florida,Alabama,Louisiana); Game Type (Big-Game). One of ordinary skill in the art would understand the various combinations that can be achieved semantically through substitutions in the parameters. For example, "Region(county1,county2,county3)", where counties are in a state, or "GameType(bird,fish,deer)" or "Game- Type(lion,bear,elk)". Such name value pair combinations can filter, or act as a query, when manually input in the toolbar of a browser. These combinations can also be informative of the resource, such as a page that is sent in response to a request. These can convey knowledge to a user viewing the URL, or can convey knowledge to a web crawler robot aggregating content about a resource. The URL not only offers a technical solution, in that it can be used to provoke a server computer to send data. It also explains the content to be received, or the viewable content as in page 250. For example, the content shown is big game hunting in Nebraska. If a reader were to read the URL, it would explain the content in the page. Page 250 is such an example, with maps and explanations about hunting season for mountain lions in Nebraska. Page 200 of FIG. 2 is similar.

Exemplary software code for enabling user's computer for documents of the displayed web pages shown in FIGS. 1, 2 and 3 is illustrated in the Computer Program Listing Appendix hereto, which is incorporated by reference herein. One of skill in the art would understand that the content and page has numerous variations as it is dynamically generated and depends on the stored data and requested page. Other exemplary implementations of various aspects of the present invention are described in the Computer Program Listing Appendix attached hereto and incorporated by reference herein. It should be understood that various aspects of the embodiments of the present invention could be implemented in hardware, firmware, software, or a combination thereof. In such an embodiment, the various components and/or steps would be implemented in hardware, firmware, and/or software to perform the functions of the present invention. That is, the same piece of hardware, firmware, or module of software could perform one or more of the illustrated blocks (e.g., components or steps). Unless explicitly stated otherwise herein, the ordering or arrangement of the steps and/or components should not be limited to the descriptions and/or illustrations hereof.

The HTML encoding includes various tags, such as the title "Hunting Big Game in Nebraska during April 2016"; hyperlinks to other files, such as image files; references to other web pages, such as reference to a Farwide web page beginning with the text "href"; a variety of control statements, such as "if" statements; and invocations of JavaScript routines. Although web server computers can store and generate HTML documents in various ways, an HTML document is essentially equivalent to a file, with a file name, stored within a file system directory on a web server computer. An HTML document contains an HTML description of a web page and is transferred to a requesting user's computer system for rendering by the user's web browser.

Exemplary software code for enabling a user's computer to program a page, such as page 200 in FIG. 2, having mountain lion selectors, is illustrated in the Computer Program Listing Appendix hereto, which is incorporated by reference herein, for example:

```
href="/araa/Area/Detail/Mountain-Lion-
Units_NE/Activity(Hunting);Region(Nebraska);GameType(Big-
Game)">Mountain Lion, Nebraska</a></h5>
    <div class="for-polygon-tt-div">
    <div class="polygon-tt-div-seasons">
        <h6    class="polygon-tt-seasons-header">No
Scheduled Seasons at this time.</h6>
        </div>
```

A fundamental structuring of information contained within a website occurs through URLs and hyperlinks that link to web pages containing hyperlinks to other web pages. A hyperlink is a string that defines a URL to a linked HTML document, in turn, having anchor text that annotates a displayed hyperlink in a rendered web page. Upon inputting a mouse click or other user input to a displayed anchor text of a hyperlink, the user's web browser is signaled to request the linked HTML document from a remote web page server. When the linked HTML document is received, the user's web browser renders and displays the linked HTML document as a rendered web page.

With reference to FIG. 3, a hyperlink from the web page shown in FIG. 2 is illustrated. On a rendered web page, a hyperlink can generally appear as a text caption, anchor text, or associated with an object that indicates or describes a web page that can be viewed by controlling a cursor to overlie the text caption and inputting a mouse click or other input to the displayed anchor text of the hyperlink.

With reference to FIGS. 1-3, the pages offer selectable options, for example buttons 104 and 106 of FIG. 1, and various other graphics and icons as active elements on which a user may input a mouse click in order to display digital information about a vertical. By clicking on the buttons, a hyperlink request associated with the page is activated to send to the host for a page similar to that shown in FIG. 2.

Figure 4:
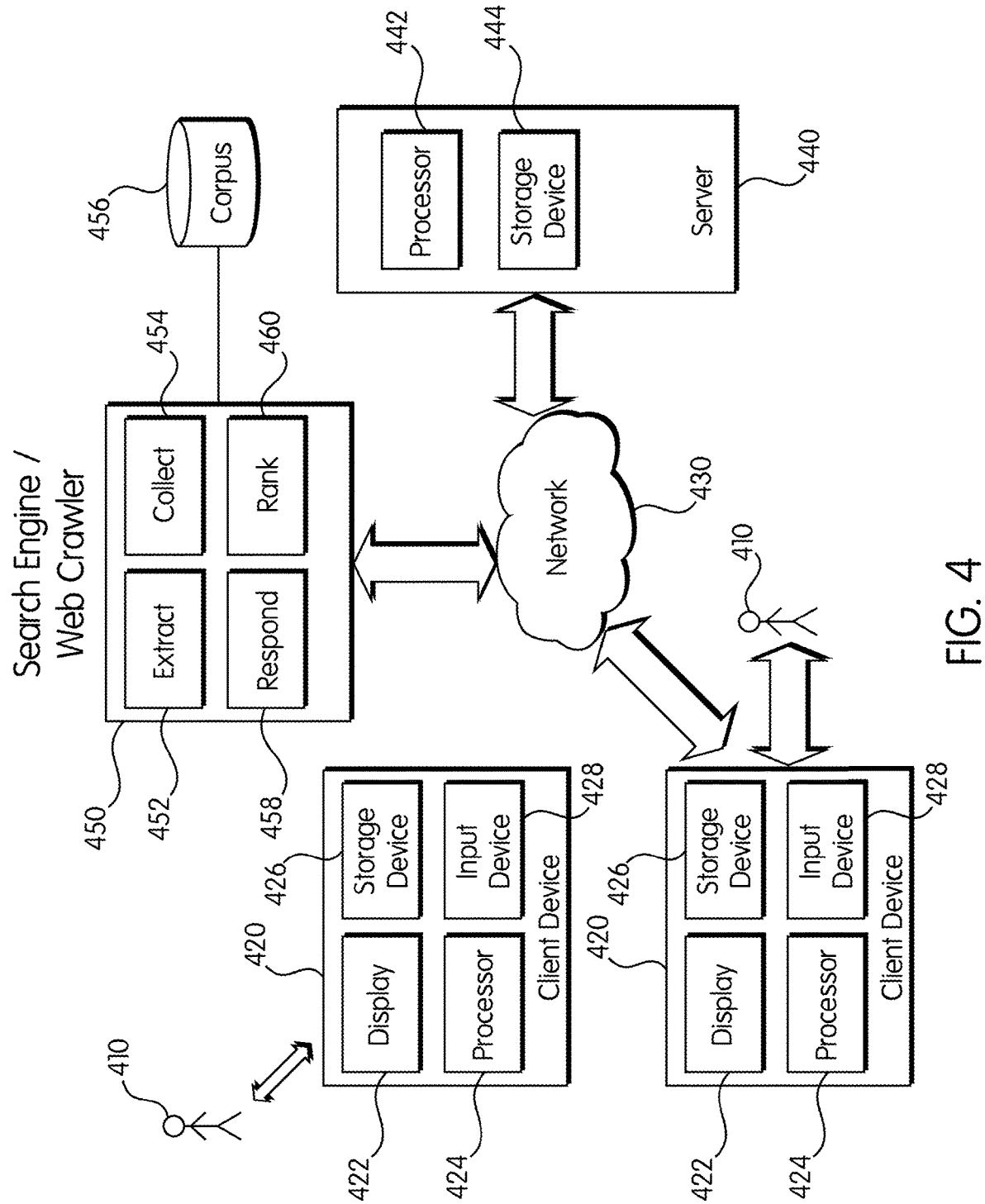
FIG. 4 illustrates a system diagram of an exemplary embodiment of an operating environment of the invention.

In FIG. 4, an embodiment of a system is disclosed for providing a semantic platform on which the website 102 of FIG. 1 may be implemented. As shown therein, a plurality of client devices 420 are in communication with one or more servers 440 over a network 430. In a preferred embodiment, client devices communicate over the Internet to the internal network 430, through various intermediate devices. The network 430 may be any type of network, such as one that includes the Internet, a local area network, a wide area network, an intranet, etc. Users 410 may be any persons that may use the web page 102 for the purpose of conducting, overseeing, reviewing, or performing actions. Users 410 may utilize client devices 420 to communicate with the server 440. Communications may be of the request and response type of Internet protocols. Client devices 420, as well as the server 440, may be configured to communicate via wired or wireless links, or a combination of the two.

The server or multiple servers are used to retrieve, construct, and transmit a response based on a received communication. The server creates new pages by reading an incoming URL, such as those previously discussed with reference to FIGS. 1-3. The structure of the URLs is related and based on a defined pattern of the server's data and information organizational structure. The organizational structure is defined by the system components, such as processors, memory, storage and databases. A preferred embodiment programs the server to read database tables which are mapped together in a way to give context to the data stored therein. The context is reflected in the URLs which are sent in pages and as responses. The organizational structures can be part of the program code and information in the back end servers of the host. Patterns of possible URL parameters are stored within and the related content stored in a database, each pattern represented by entities of the data and attributes and relationships of the entities. The patterns are information about the data and storage of the data. The attributes organize categories of information and form relationships among the entities.

Client devices 420 may represent a desktop computer, laptop computer, cell or smart phone, tablet device, or other type of computing device. Each of the client devices 420 may be equipped with one or more computer storage devices 426 (e.g., RAM, ROM, PROM, and/or SRAM) and one or more processing devices 424 (e.g., a central processing unit) that are capable of executing computer program instructions. A computer storage device 426 is preferably a physical, non-transitory medium. Any of the client devices 420 may further include a display 422 that is capable of rendering an interface such as the ones described in subsequent sections and one or more input devices 428 (e.g., keyboard, microphone, camera, video camera, scanner, joystick, remote control device, and/or touchscreen). Users 410 may manipulate interfaces rendered on the display 422 using the input devices 428 to communicate with the server 440.

The server 440 includes one or more processors 442 and one or more computer storage devices 444. A computer storage device 444 is preferably a physical, non-transitory medium. The server 440 can generally represent any type of computing device that is capable of communicating with the client device 420. In some embodiments, the server 440 comprises one or more data computing devices that execute a web server and an application server for communicating with the client device 420 over the Internet. An example of such software is Microsoft Corporation's Internet Information Services (IIS) module. The storage device 444 on the server 440 can store applications or software code that are configured to provide semantically relevant pages in performing data filtration for classifying users and information based on logically related blocks stored in the database. Specifically, the server 440 may be configured to provide services to users 410 via an interface displayed on client devices 420. The server 440 can be configured to act as an engine for end users looking to find information about hunting or fishing regulations, guide services, and other informational needs to enjoy the activities, regardless of where the information is located or where the users plan to visit and to perform the steps in any of the processes described herein of FIGS. 6-9 and 11. The server 440 can further be configured to transmit data for displaying pages, HTML documents, and creating URL's such as those shown in Appendix A. For example, a server 440 may cooperate with a client device 420 to present a document to a user 410, and to display a user interface that permits the user to select from a number of vertical selections, such as hunting or fishing.

Storage devices 426 or 444 may be internal or external physical media on which the data may be stored, imported, or accessed. Storage devices 426 or 444 may be located on yet another storage medium or facility not shown herein, such as a data storage warehouse, server farm, cloud storage facility, or file hosting service. It should be noted that the system shown in FIG. 4 is merely meant to demonstrate an exemplary embodiment of an operating environment and should not be construed as limiting in any manner whatsoever. The particular configuration shown in FIG. 4 can be altered in numerous ways without departing from the principles herein. For example, it should be noted that the functionality of the server 440 shown in FIG. 4 may be carried out by a plurality of servers 440.

Furthermore, while FIG. 4 illustrates a plurality of client devices 420 in communication with a server 440 over a network 430, it should be recognized that the functionality provided by the server 440 to the client devices 420 may be performed locally on each of the client devices 420. For example, client devices 420 may utilize an application and/or server that executes locally on the client devices 420 to perform the functions of the server 440. Thus, any functionality of the server 440, which is described herein, can alternatively be implemented by the client device 420, and vice versa.

In certain embodiments, the client device 420 and the server 440 are integrated into a single device (e.g., a standard PC computer, tablet, laptop, smartphone, or other device). For example, such a device may run a standard operating system (e.g., Windows, Linux, OSX, Android, iOS).

A data processing system suitable for storing and/or executing program code may include at least one processor coupled directly or indirectly to memory elements through a system bus. The memory elements can include local memory employed during actual execution of the program code, bulk storage, and cache memories, which provide temporary storage of at least some program code to reduce the number of times code is retrieved from bulk storage during execution. Input/output (I/O) devices (including, but not limited to, keyboards, displays, pointing devices, touchscreens, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments described herein may be hardware-based, software-based, or may comprise a mixture of both hardware and software elements. Thus, while the description herein may describe certain embodiments, features, or components as being implemented in software or hardware, it should be recognized that any embodiment, feature, or component that is described in the figures or description herein may be implemented in hardware and/or software. In certain embodiments, particular aspects are implemented in software (including, but not limited to, firmware, resident software, microcode, etc.).

Embodiments may include a computer program product accessible from a computer-usable or computer-readable medium providing program code for use by or in connection with a computer or any instruction execution system. A computer usable or computer readable medium may include any apparatus that stores, communicates, propagates, or transports the program for use by, or in connection with, the instruction execution system, apparatus, or device. The medium can be magnetic, optical, electronic, electromagnetic, infrared, a semiconductor system (or apparatus or device), or a propagation medium. The medium may include a computer-readable storage medium, such as a semiconductor or solid state memory, magnetic tape, a removable computer diskette, a random access memory (RAM), a read only memory (ROM), a rigid magnetic disk, an optical disk, etc.

For example, the entire semantic platform may be contained on computer readable media (e.g., a CD, hard disk, USB drive, or other bootable media) which, when inserted or coupled to a device (e.g., a standard PC computer, tablet, laptop, smartphone, or other device), invokes the platform (e.g., as "live-media"). Live-media may also contain a suitable operating system (e.g., Linux) and/or may also contain a document collection 120, or a portion thereof. When implemented as live-media, the platform may not need to alter the contents of certain memory or storage devices coupled to the device.

One useful feature provided by this system relates to the fact that a repository of informational entries can be created that carry various attributes organized and aligned within a database based on how valuable and relevant those various attributes are to one another. For example, regulations and other information about the two sports of hunting and fishing as defined and understood per the individual state game and fish organizations for multiple states can provide relevant results. A business classifier uses database blocks that have been defined internally. The organizational structure provides integration points for relevant verticals of interest added into the database, with a different definition or set of attributes and without changing the performance of the initial database blocks. For example, in a preferred embodiment, database blocks include Activity-Region-Area-Authority (ARAA), a centralized block. In addition, database blocks can be defined which function as a form of special logic specific to a vertical, for example, Genre, Season, Species (GSS). A person of ordinary skill would understand variations could be added for other types of data sets, including categories such as falconry, mountain biking, boating, skiing, ranching, rafting, and riding. This useful feature, which permits an initial classification while allowing additional block additions, is facilitated by a unique mapping scheme that connects the blocks and prioritizes the information for processing of requests and improves the manner in which the next pages are selected.

Search Engine and Web Crawler Request for URL

With continuing reference to FIG. 4, a search engine or web crawler 450 is in communication with one or more servers 440 over a network 430. In a preferred embodiment, FIG. 4 software modules process a request for a specific, dynamically generated document using a semantic URL by a web crawler 450 instead of by an active user in a browser. The web crawler accesses a source web page that includes a hyperlink specifying a URL. A URL, as shown in FIGS. 1, 2, and 3, defines a pattern of the organizational structure of content in the data being retrieved. The URL relates to a pattern represented by relational attributes of a schema that organizes categories of information and the relationships among them. The semantic URL is easily user readable, as it clearly specifies the content of the page requested. If the web crawler 450 accesses a hyperlink, the URL is incorporated into a request message that is sent to the one or more servers 440 over the network 430. As the web crawler accesses pages, extract processor 452 extracts them from pages, URLs and hyperlinks. It stores a collection 454 in a corpus 456. The extract processor 452 starts by reading a URL in a seed page. It then collects all the links from the seed page and all pages linked to the seed page. After it has stored data about all the pages it encounters, it responds to queries for the pages. The web crawler or search engine ranks the pages. If a keyword appears, a page can achieve a higher rank.

The application server evaluates the URL and generates a URL. A URL specifies the query parameters and/or other coding needed to dynamically access or generate a desired encyclopedia article or other information (in general, the internal attributes of the database).

In the example of FIG. 3, "www.farwide.com/araa/Activity/Detail/Hunting" of a URL 250 comprises a source identifier that specifies a source of the desired, dynamically generated information. In this case, the URL refers to data within an organizational schema. The content to be retrieved is represented by the pattern in the database blocks. The pattern is communicated using attributes of data stored in the database blocks, along with relationships of the data fields. This source identifier is mapped from the ARAA received in the URL. Because the internal location is relayed in the original URL, response programming creates a return message comprising the generated web page (or other data) and the URL that was previously requested, and then communicates a return message to the requesting browser or web crawler.

Patterns of URL Parameter

Figure 5:
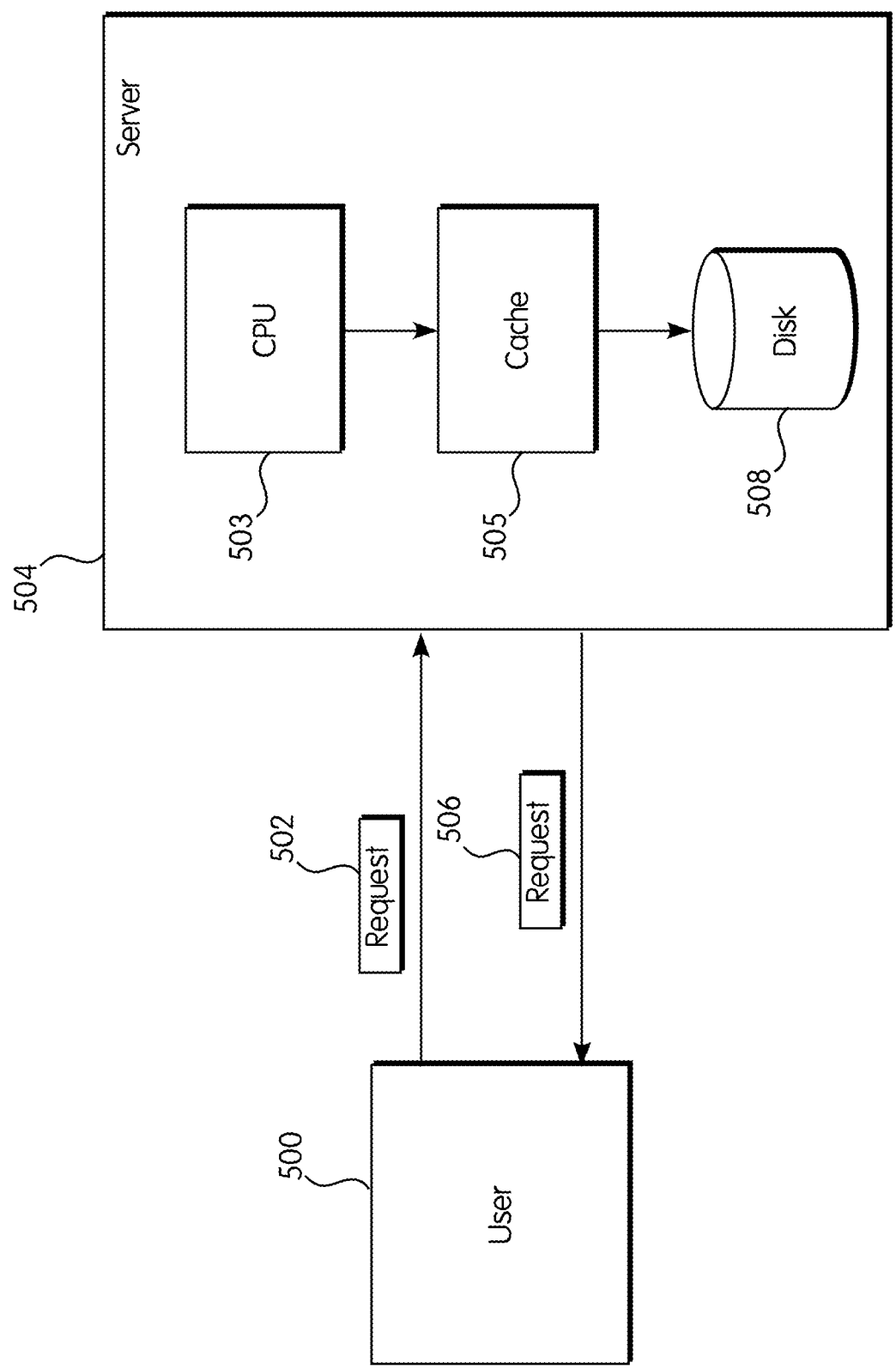
FIG. 5 illustrates a system diagram of an exemplary embodiment of an operating environment of the invention.

Returning to FIG. 1, the displayed web page 102 includes buttons, such as buttons 104 and 106, for selecting from multiple particular verticals for hunting and fishing. Clicking on button 104 or 106 will send a request. As shown in FIG. 5, a user 500 may send a request 502 to a server 504, and the server 504 may reply with a response 506. The request 502 may identify a particular vertical on the server 504 that the user 500 would like knowledge. For example, in an original request 502, a user may request that the server 504 send the homepage, in this case www.farwide.com. This document may be stored on a disk 508 of the server 504. Then the server 504 retrieves the document from the disk 508 and provides the document to the user 500 (via the response 506). In a preferred embodiment, requests are dynamically generated documents that are provided in response to semantic URLs. That is, it may be desirable to select the content of a document provided to a client based on information provided in the request. For example, a user 500 may send the request 502 to the server 504, requesting the document index.html. The server 504 may receive the request, and, using information provided in the request, generate a document to be provided to the user 500 in response to the request 502.

FIG. 3 shows a typical web page 250 rendered by a web browser for display by a personal computer. The displayed web page 250 is associated with a URL, in this case https://www.farwide.com/araa/Area/List/-/Activity(Hunting);Region(Nebraska); GameType(Big-Game) and includes information described in the title 252, "Hunting Big Game in Nebraska", that describes the content of the page, which, in this case, is regarding hunting big game. In this page, activity is associated with big game in the area of Nebraska. The URL defining patterns of possible URL parameters within an organizational structure. For example, the hierarchy of the URL conveys the hierarchy of the data as stored in a database or other storage device at the server. The URL reflecting the storage as it is logically arranged, stored or accessed in the server, a database at the server, or in a cloud using web services. The logic can also be embedded in the program code of the server, an algorithm for storing, accessing and arranging the data as described in the URL. For example, the data may be modeled using an activity, region, area with connections or mappings to a game-type. The arrangement of the data facilitates the production of URL's and provides context to the URL which can increase the relevancy of the URL to the data in a produced page. In the displayed web page 250, a multi-panel arrangement is used, having an active panel 254, and an informational panel 256 is used to display information about the contents of the active panel. Various graphics and icons are provided within the active panel as active elements on which a user may input a mouse click in order to display digital information about the vertical. An active map 258 that can be used to further refine the search, for example, by choosing counties, gaming areas or other divisions, either interstate or intrastate, and provides different information about areas within the search, is embedded in the displayed web page 250.

Hyperlink Examples

The semantic information is within the page and the URL. Relational attributes and semantic information of a specified URL can be entered by a user into an address data field of an application. By parsing the received URL, the server is able to detect a relational attribute that indicates a hierarchical location of the dynamically accessed data from among a plurality of sources of data stored in the database, and semantic language for the dynamically accessed data indicating an area of subject matter to be searched and accessed from among the information associated with the relational attribute in the database. The subject matter corresponds to the semantic language of the specified URL entered by the user by using the relational attribute to indicate a level corresponding to the data type of the dynamically accessed data. It uses the semantic language to create an informational page. It transmits the informational page, for generating a URL for submission, such that the URL can be used to filter the dynamically accessed data for return.

Figure 6:
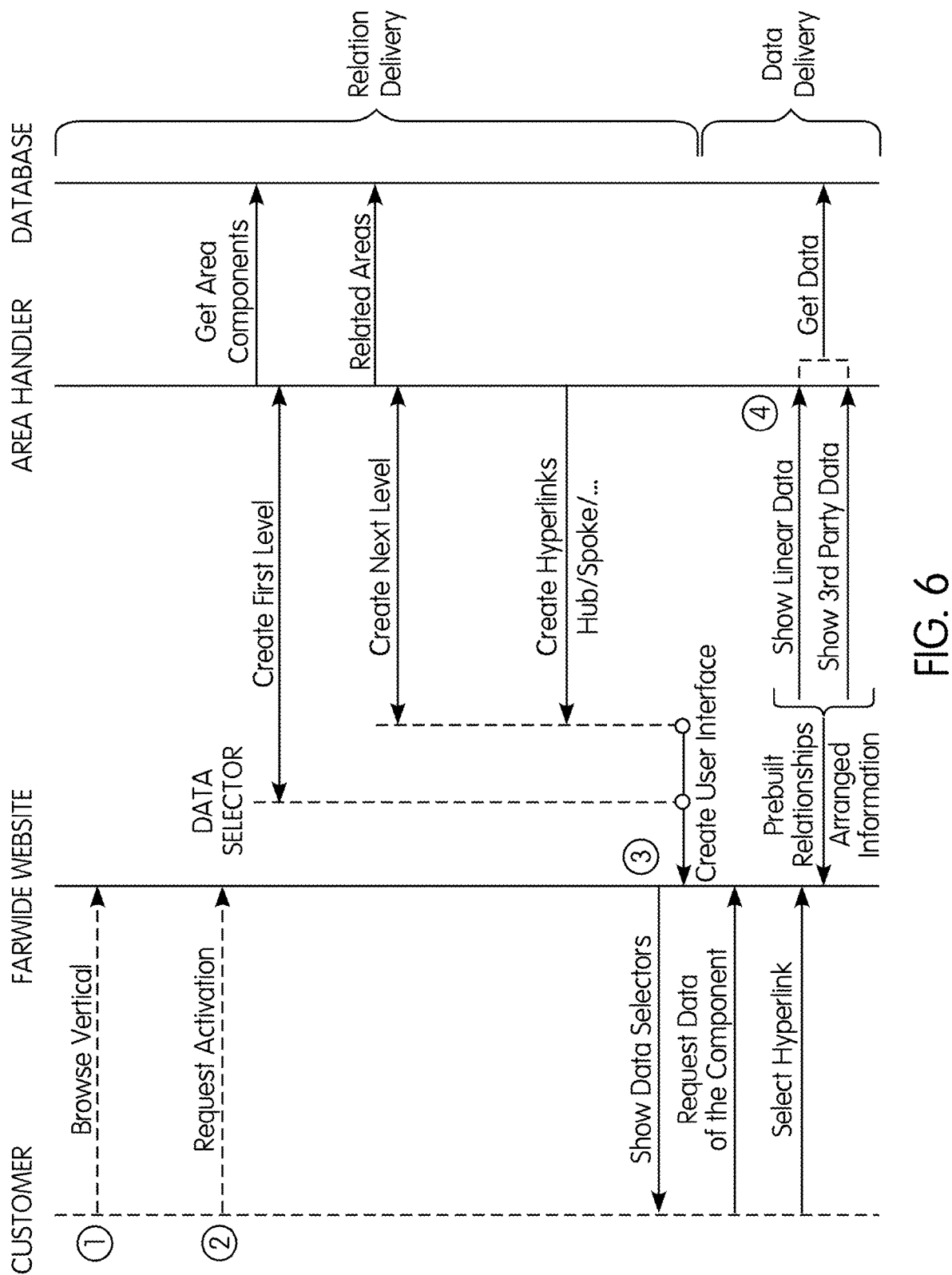
FIG. 6 illustrates a flow chart presenting a process for selectively, automatically creating a web page related to a semantically oriented URL, in accordance with one embodiment of the invention.

FIG. 6 exemplifies the process flow for providing dynamically accessed data stored in a database to a requester that is aware of only a specified uniform resource locator (URL). A user browses a vertical on the web page at step 1, then sends a request at step 2 when a user has found content by clicking on a hyperlink, which is transmitted to a server from a user. The server receives the URL that includes at least a relational attribute and semantic information. The URL specifies particular data out of numerous possibilities. The specified URL that originated at a user's computer, originates from a hyperlink or was actually specified by directly entering the URL by a user into an address data field of an application. The server then parses the hyperlink. Based on the hyperlink, the server is able to detect the content requested.

The server parses the received URL to detect a relational attribute that indicates a hierarchical location of the dynamically accessed data from among a plurality of sources of data stored in the database. Using the relational attributes, the server is able to determine different parts of a URL, such as a first level, second level, third level, etc. The levels corresponding to the data entities in the database.

The server can also determine the attributes based on the received semantic language, such as key value pairs. The semantic information is used for dynamically accessing data. The semantic information indicates related areas of subject matter to be searched and accessed from among the information associated with the relational attributes in the database. The subject matter corresponds to the semantic language of the specified URL entered by the user. The semantic information is matched, in one embodiment, to different levels of a URL. With regards to FIG. 3, the semantic language "hunting" matches the level "activity". The levels form a pattern, and within the pattern, the semantic portions define each level. Thus, hunting could be further refined to include types of guns, weapons, or other modifying data through use of the semantic parameters.

The relational entities are used to indicate a level corresponding to the data type of the dynamically accessed data. The server uses the semantic language to access the attributes, but it is also accessed from the database and used to create informational pages, such as a web page. After the data and the relational entities are retrieved, the server combines them into a URL and uses the associated data to build a user interface-displayable page at step 3. The data matches the URL. Matching algorithms on the user's computer can be used to determine relevancy and ranking, such as by a user, or some other external third party system like a web crawler. The server transmits the informational page and URL.

In some cases, a user will enter information in an address bar that comprises a URL. The system can read such a URL and return information, since every URL corresponds to data in the data base and is a map of the data. The URL can be used to filter the dynamically accessed data for return to the requester and comprises relational attributes and semantic language. The method can be used with web crawlers, substituting a web crawler for the user. The web crawler behaves in such a way that the actions mimic a user-sending a request and receiving a response.

Representations of Items Comprises Names, Values, and Categories

Patterns in the data are preprogrammed in the database using different models. The URL defines patterns of possible URL parameters within an organizational structure. In one embodiment, a hub and spoke model maps data to logical representation. The representation is captured in the context of the URL and can also be created in programming instructions for processing by a computer or by mapping tables together with database languages. URLs can be used in the system for changing and updating a previously received field or subfield in the database, deleting a previously received subfield, or adding a new subfield. The URL can be used to filter the dynamically accessed data for return to the requester and comprises relational attributes and semantic language.

With reference to FIG. 7, the beginning of data filtration begins when some selection is made. The process filters users and information based on a logical data model, and a database is used for filtering the data. Specifically, in an embodiment where verticals are used, they can be added to a model. Verticals would be defined and the component data would be added or defined. For example, as shown in FIG. 7, if the only component that was effected were the activity, this field would be the selectable option and could be related to any number of components. In the column marked "no column name", it can be seen that 6 activities are present.

Process for Creating a Semantic Oriented URL

Figure 8:
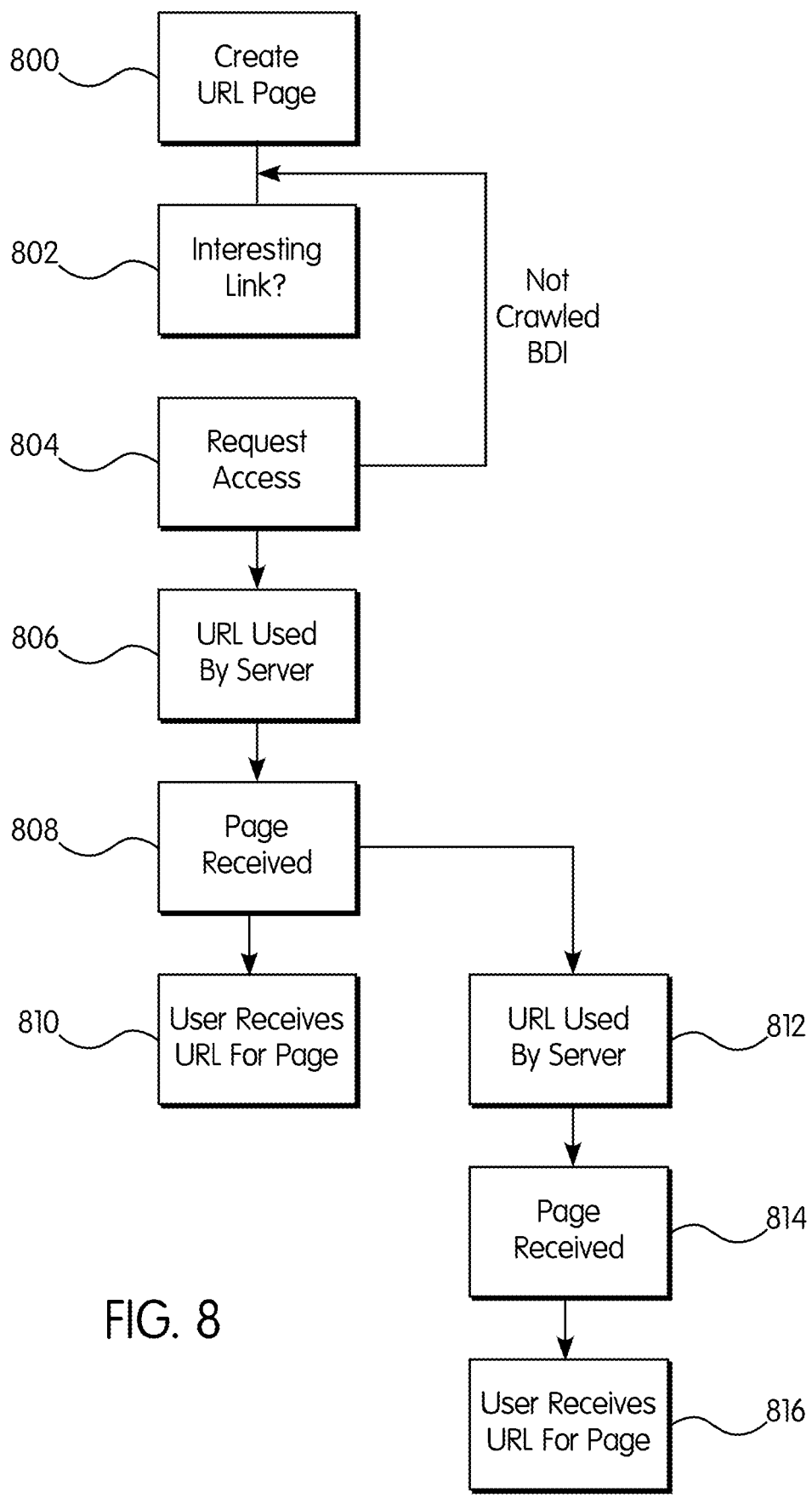
FIG. 8 illustrates a process diagram, exemplifying a method of creating and using a URL.

An illustrative process for selectively, automatically creating a web page related to a semantically oriented URL, in accordance with one embodiment, is shown in FIG. 8. A step 800, a link to another page is located in a web page. This may be done in any suitable way (e.g., by parsing the link), as the invention is not limited in this respect. The process continues to a step 802, where a user or a web crawler determines if the link is interesting. That is, the user or the web crawler determines whether to request access to the page, thereby causing it to be cached. As is discussed in greater detail below, the user or the web crawler may make this determination using suitable criteria from the URL, in any suitable way, as the invention is not limited in this respect. When it is determined that the link is to be requested or crawled, the process continues to a step 804, where the user or the web crawler requests access to the web page referenced by the link from the web server. When it is determined that the link is not to be crawled, the process returns to the act 801, wherein the web crawler locates the next link in the web page.

The determination of whether a link is to be requested or crawled may be made in any suitable way, as the invention is not limited in this respect. In one embodiment, a user or a web crawler may view the URL to make the determination. Any suitable rules or criteria may be used, as the invention is not limited in this respect. The user may view the URL and determine that the information in the URL is relevant and related to information that is needed.

For example, the URL can provide patterns related to a search of a specific activity. The URL defining patterns of possible parameters within an organizational structure. If the link or URL includes any of the patterns between attributes or information, the client may access the link. In addition to, or instead of these, the relation to the URL also includes relations between schema fields. The relations may include one or more patterns, which, if included in a URL or link, signify to the user or the web crawler that the link is relevant and to be followed. Another example of a criteria that may be used by the user or the web crawler to determine whether a link should be crawled is the attributes in the URL. The web crawler can use patterns in the URL, levels of the patterns, or semantic information in the URL, at particular levels, to make valuable rankings of the URL.

At a step 806, a URL or link that is followed is used by a server to create a request for a response page. Data is created that relates to the URL. The data and information can be created in any suitable way. The pages can be created using database schema by reading a logically stored set of data blocks in the database. At a step 808, a page is received by a user or a web crawler with relevant data according to the semantically oriented URL, the data and organization of the web page, directly related to the schema and relationships encoded in the URL, and the URL being used to logically identify the set of data created and embedded into the web page.

At step 810 the user reviews URL to determine the content for the displayed page in the browser. The language in the page matches the semantic and contextual information in the URL, such as hierarchical entities, objects, and keywords that are part of the URL. Alternatively to step 810, at step 812, the web crawler indexes the page by reading the content, URL, and any other information on the page. At step 814, the web crawler matches content, for example, by matching the URL to page content, such as the patterns in the URL or semantic information, like attributes of an entity, to make a determination. At step 816, based on the matching process, rank is determined for the page.

To enhance the search engine rank, as described in FIG. 8, the URL or URI contains semantic elements that are described in the page, for example, descriptions are embedded in the standard HTML <meta> document tags, as well as detailed schema.org markup, and Facebook open graph (og:) markup. One of skill in the art would recognize various implementation, such as Microdata, RDFa tagging, or, on dynamically loaded pages, JSON-LD.

The algorithm described in FIG. 8, is used for defining a pattern of a possible URL parameter within the organizational structure of related content. Patterns represented by relational attributes of a schema that organize categories of information and the relationships among them are created at the server and sent as a URL to the client computer. The creation of the page is reflected by the automatic generation of the URL comprising the relational attributes of the schema and semantic information about the relational attributes at the server computer, either in program code or a database. A computer readable medium having computer executable instructions thereon can be used to capture the information for automatically generating a Uniform Resource Locator (URL) from schema and semantics of an organizational structure.

A typical URI (involving a search for a relevant area in which to hunt) might be the following: /araa/Area/List/-/Activity(Hunting);Region(Nebraska);GameType(Big-Game);Date(2016-04) In each case, specific sections will have schema.org markup relevant to the URI sections above. The content of each section will relate a URI to a model, such as the "Region" URI using the schema.org model to the indicated value of "Nebraska". Providing markup that matches to the value in the URI, surrounding standard HTML content enhances the likelihood of Web Crawlers of indexing the URI segments above with the specific content sections. Providing additional schema.org markup in that section provides the Web Crawlers with enhanced "knowledge" of what that content section is really about, providing more than just parsing the content to determine meaning.

The resulting HTML will contain data with this type of meta tag and markup:

```
<html>
<head>
<title>Hunting Big Game in Nebraska during April 2016</title>
<meta name="description" content="Nebraska contains 82 areas providing Hunting for Big
Game. The Nebraska Game and Parks Commission maintains authority in the areas listed.
There are 42 areas with Hunting Seasons during the month of April, 2016. There is a FarWide
courtesy alert regarding one or more of the areas below during this time."/>
<meta name="keywords" content="Nebraska, Hunting, Big Game, Antelope Firearm Units,
Antelope Muzzleloader Units, Bighorn Sheep Units, Deer Antlerless Only Season Choice
Units, Deer Firearm Units, Deer River Antlerless, Elk Units, Mountain Lion, April 2016"/>
</head>
```

With regards to the above example, a person of ordinary skill in the art will understand that the actual content will vary and can be dynamically generated. In another example, identifiers are used to clarify the specific content in the page.

```
<!-- OPEN GRAPH -->
<meta property,"og: url"content="http://www.farwide.com/araa/Area/List/-
/Activity(Hunting);Region(Nebraska);GameType(Big-Game);Date(2016-04)" />
<meta property="og:type" content="place" />
<meta property="og:title" content="Hunting Big Game in Nebraska during April 2016" />
<meta property="og:description" content=" Nebraska contains 82 areas in which you may
Hunt for Big Game. The Nebraska Game and Parks Commission maintains authority in the
areas listed. There are 42 areas with Hunting Seasons during the month of April, 2016. There
is a FarWide courtesy alert regarding one or more of the areas below during this time." />
<meta property="og:image"content="http://www.farwide.com/images/araa/Region/US/Nebra
ska.png" />
```

(Continued below)

A third example shows each section of the HTML can include schema content markup appropriate to the content in the section. For example, providing Geo Coordinates for Nebraska. In addition to just Geo Coordinates, markup will also extend, for example, the schema.org Place—Landform model (not shown).

```
<div itemscope itemtype="http://schema.org/Place">
<h1>Hunting Big Game in Nebraska</h1>
<div itemprop="geo" itemscope itemtype="http://schema.org/GeoCoordinates">
<meta itemprop="latitude" content="41.1289" />
<meta itemprop="longitude" content="-98.2883" />
</div>
</div>
```

Each of the areas listed will also have schema.org markup

```
<div itemscope itemtype="http://schema.org/Place">
<h1>Big Game, Mountain Lion Unit, Prairie, Nebraska</h1>
<div itemprop="geo" itemscope itemtype="http://schema.org/GeoCoordinates">
<meta itemprop="latitude" content="42.16443" />
<meta itemprop="longitude" content="-101.7447" />
</div>
```

In each of the areas, each season will use markup for an extension of the schema.org Event model

```
<div itemprop="geo" itemscope itemtype="http://schema.org/Event">
<meta itemprop="name" content="Big Game Hunting, Deer Firearm, Blue Northwest Area, Nebraska, April Firearm Season" />
<meta itemprop="startDate" content="2016-04-01T24:00" />
<meta itemprop="endDate" content="2016-04-15T24:00" />
</div>
</div>
</html>
```

The set of rules for creating the web page is assimilated into the data store. They may be assimilated in any suitable way, as the invention is not limited in this respect. In one embodiment, the rules are assimilated using data blocks that are interchangeable and connected logically. The logical connections provide a schema for the creation of web pages. In one embodiment, there may be several levels of data blocks, the top level related to a vertical and each sublevel related in a unique way to the top level.

The data rules may be devised in any suitable way. For example, the rules may be defined so that pages that are created are hierarchical, have a hub and spoke with vertical information sets at the top level hub and sublevel spokes provided to store information that is directly related to and modifying the hub or related information at each sublevel and connected to the hub. Spoke information may be related to only a subset of top level hub information.

Intermediate Pages Used to Build the Nebraska Big Game Page

Figure 9A:
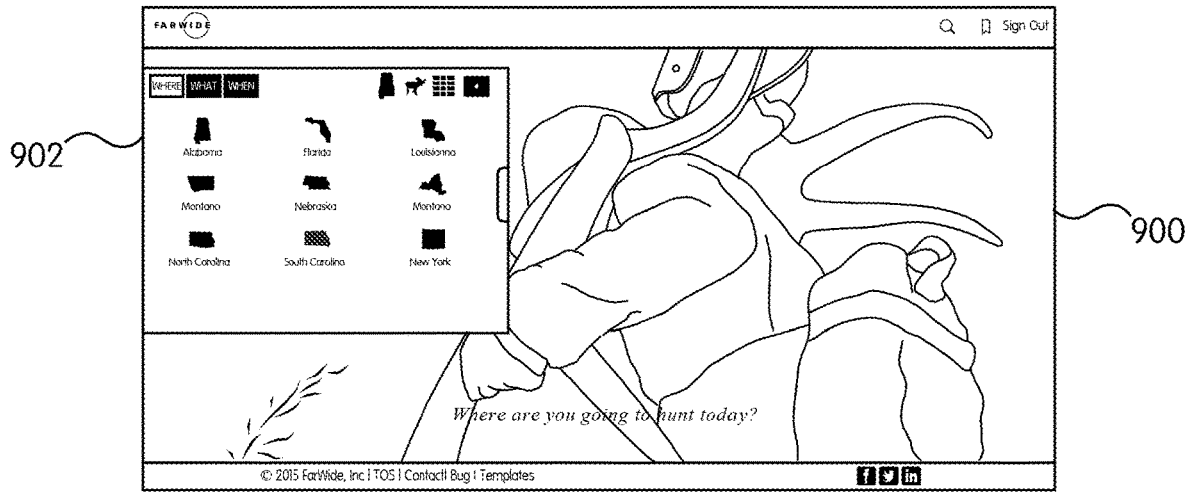
FIGS. 9A-9C illustrate interfaces used in a process to narrow a URL.
Figure 9B:
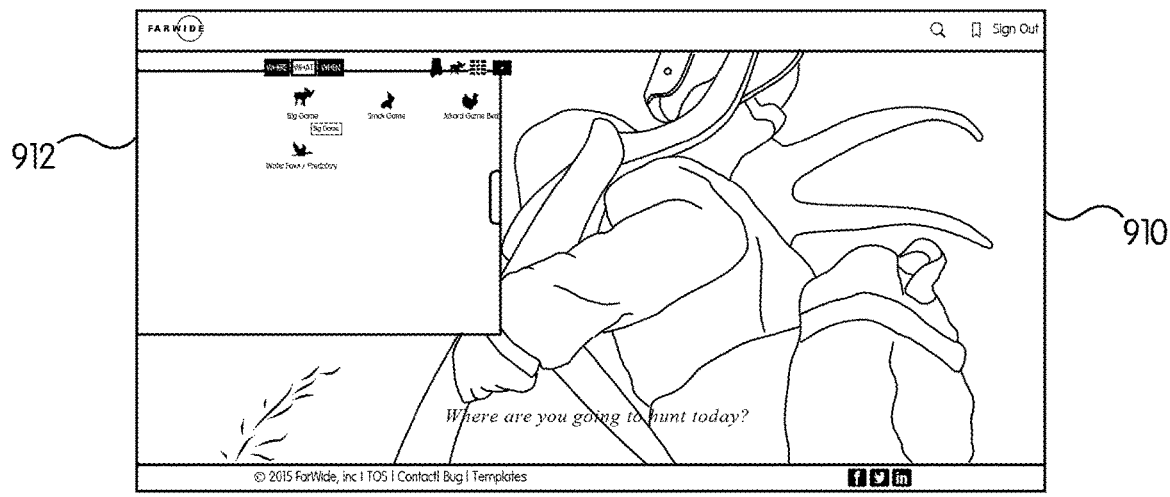
Figures 9C, 10:
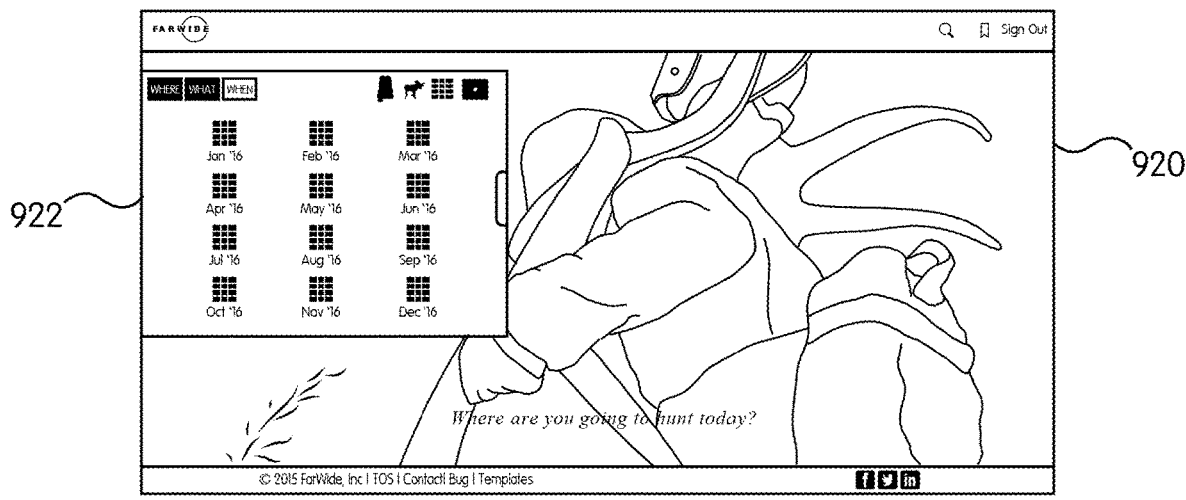
FIG. 10 illustrates database entries for an ARAA GS system.

In a preferred embodiment, several intermediate pages can be used to distill a request. FIGS. 9A-9C show a series of pages that are used in an embodiment to drill down the ARAA. As a result of completing the series, a destination page is determined, for example, page 250, as shown in FIG. 3. Once an information and activity component is selected, an interface is provided that generates a series of data selections that correspond to the available data components with a semantic URL platform. With reference to FIG. 9A, a number of regions is provided. With reference to FIG. 9B, several types are provided to narrow down the selection, in this case the type of game, which is big game. With reference to FIG. 9C, ad hoc selections are finalized. A date component is active in the web page for selecting a date parameter to further narrow a search. The date selection would provide corresponding information as determined through the previously selected database components.

The invention also includes a method of providing hub and spoke data through a web application using a URL and pages. An illustrative process for selectively automatically populating a cache, in accordance with one embodiment, is shown in FIG. 8.

FIG. 10, for the farwide.com website as discussed in FIG. 1, includes components. The relationships are mappings between the components of the hub schema and the components of the spoke schema.

Figure 11A:
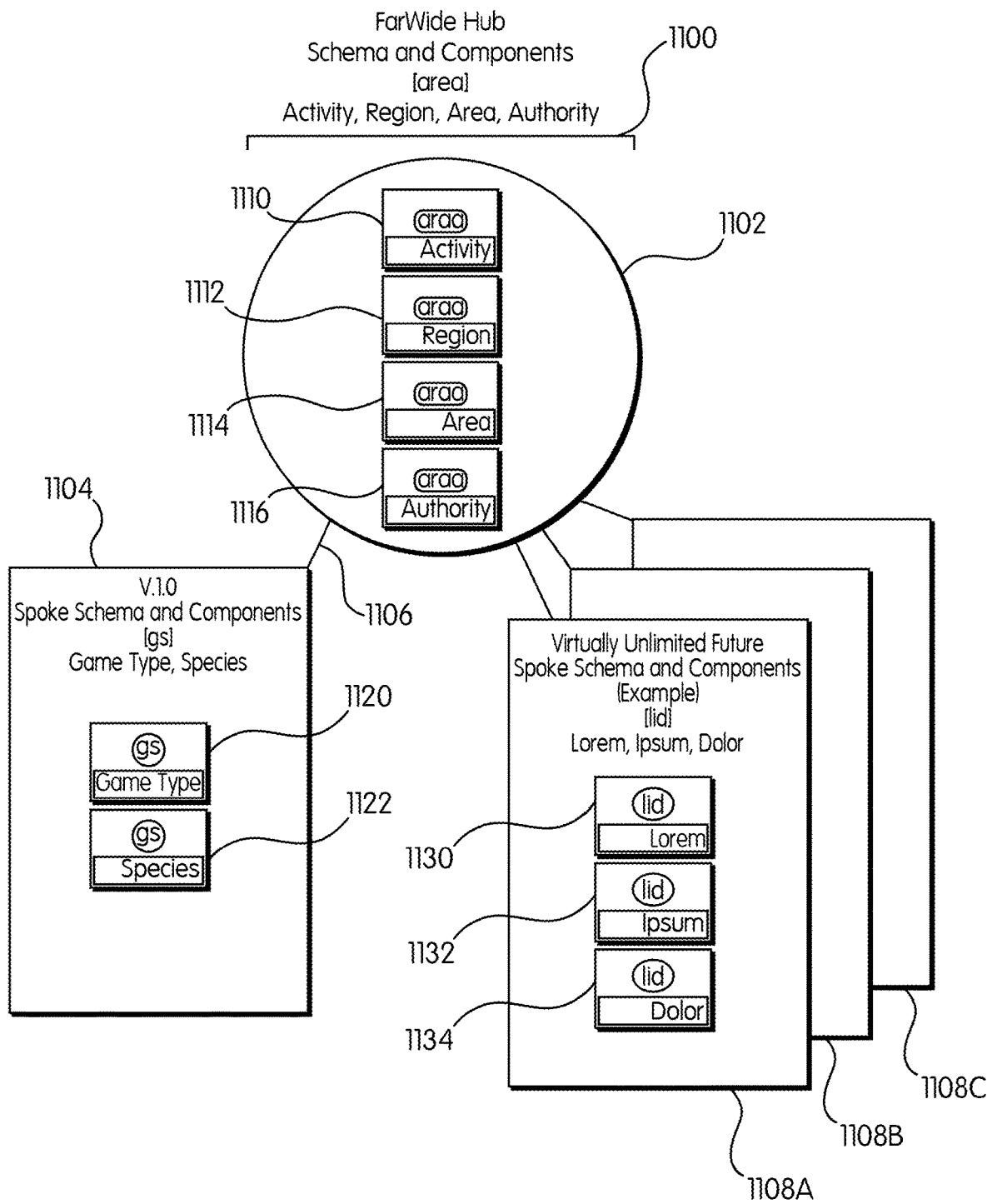
FIGS. 11A-11C illustrate a method of building a URL with a semantic pattern.

FIGS. 11A-11D illustrate a component model used to create simplified entity relationship diagrams for representative example information relationships, or "schema", that can support semantic oriented URL provisions in various embodiments according to the present invention. With reference to FIG. 11A, a data model 1100 illustrates a particular embodiment according to the present invention. This diagram is merely an illustration and should not limit the scope of the claims herein. One of ordinary skill in the art would recognize other variations, modifications, and alternatives.

Data model 1100 is a representative example of a hub schema diagram with spoke schema components. FIG. 11A illustrates data model 1100 that includes a hub schema 1102 and preconfigured spoke schema 1104 and additional spoke schemas 1108A-C.

In this example, hub schema 1102, for the farwide.com website as discussed in FIG. 1, includes components for activity 1110, region 1112, area 1114, and authority 1116, identified as the "araa". A preconfigured spoke schema 1104 includes components GameType 1120 and Species 1122, identified as the "gs". As indicated by connector 1106, the spoke schema 1104 has a connection to the hub, indicating relations. The relationships are mappings between the components of the hub schema 1102 and the components of the spoke schema 1104. Spoke schema 1104 is unlimited in the amount of compartmentalized information that can be added to the hub through the various relationships mapped between the hub and spoke.

Spoke schemas 1108A-C can be added to the application model without interfering with previously configured spoke schema 1104. As exemplified by spoke schema 1104, spoke schemas are configured to interact with the hub schema. Spoke schemas can also be configured to interact with pre-existing spoke schemas and can also operate independently. Spoke schema 1108A can be added to the application during the initial configuration, or at a later time, when the information becomes necessary or identifiable. The spoke schema 1108A-C are created and added to the model without interfering with previously configured spoke schema 1104, hub 1102, or the relations there between. Spoke schema 1108A is added to hub 1102 to generate information identifying standing water information related to the vertical, specifically boat 1130, dock 1132, and gear 1134. Unlimited additional spoke schemas may be added to the data model 1100. For example the acquisition of other websites related to camping makes available information related to campsite services. The compartmentalized information is added to hub 1102 as spoke schema 1108B with components related to camping, such as campgrounds, camp utilization, RV storage, etc. The spoke model can also compartmentalize third party information for addition to the data model 1100. For example, to add professional services from foreign schema, the additional layer of information is added as an additional spoke schema. Other attributes can be added, and other arrangements can be used by those of ordinary skill in the art without departing from the scope of the claims of the invention.

In one embodiment of the invention, a system of using the hub and spoke model on one or more server computers, such as web server or cloud computer, working along with one or more storage devices, file systems, memory, or database, is capable of storing instructions that, when executed by the computer, cause the one or more computer to perform operations for building a URL. First, determining, for each hub, respective components that can be used for filtration. Such as limiting the data provided in a page to the useful data relating to a specific pattern. The pattern based on a selection of relational attributes within an organization, for example, the information could be all the data related to a specific filter in a vertical. In one embodiment, this could be all the big game areas for hunting in Nebraska. In such an instance, all the regions and information about them would be distributed with the page. In the same instance, it would be easily cognizable because the URL would identify the pattern and also the name value pairs associated within pattern entities. So a spoke would match to a name value pair component and the URL would exemplify that. The system, for each spoke component, determines an explicit relationship with an associated hub component, wherein relevant semantic information from a Uniform Resource Locator (URL) are used to determine topic(s) for relating relevant either single or multiple spoke component data using a mapping table. The system calculates a modified set of semantic attributes. The semantic attributes can be provided explicitly or contextually. In the case of contextual semantic values, it is the relationships between entities that provides a semantic aspect to the URL. The URL can be read as describing a location in an organization. For example, if an organization is a book, the semantic informing a client or customer to a precise page within a book by describing an outline or roadmap of how to get there. The potential of increasing or decreasing the complexity of a Uniform Resource Locator (URL) semantic information exists for each click of a page, in one case the more specific choices of URLs are used for limiting scope of filtered content. In other cases, less specificity of URLs is used for broadening scope of filtered content. In one embodiment, the users can manually change the URL when a pattern in the URL is well understood. By changing the URL, the user can cause the URL to transmit to the server to act as a query to the server data center. The URL can provide a tool for accessing data. Specified choices of URLs with different but related semantic attributes for changing scope of filtered content.

Figure 11B:
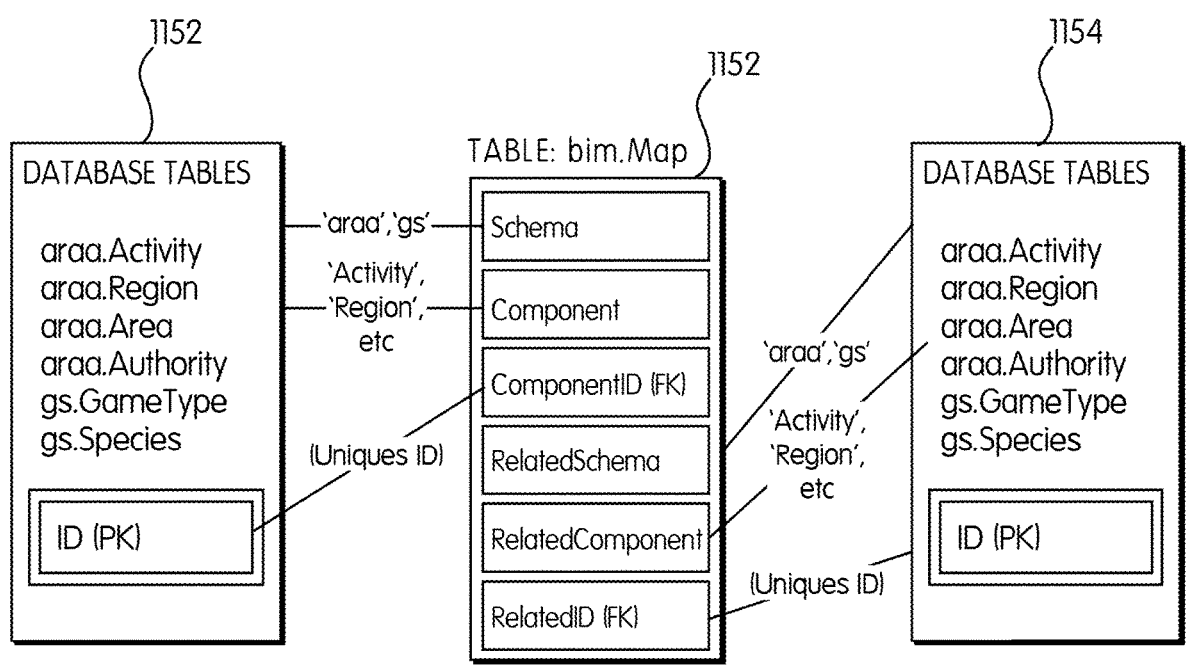

FIG. 11B illustrates relationships between schemas and fields used to create the relationships. In FIG. 11B, mappings 1150 are used for explicit and implied relationships between the schemas and database tables shown in tables 1152 and related tables 1154. Schemas and components can be configured to inherit implied relationships. The tables 1152 are related by schema, component, and component ID to tables 1154. Any schema can be related to any schema, including itself. Any table can be related to any table. Schema mappings may be configured to external sources, such as a Web API or a web service. Explicit relationships are those that are expressly defined. Implied references are those that are created as a result of other existing explicit references and the constraints they impose on components they are related to. For example, since region is explicitly related to authority, and region is explicitly related to area, it can be implied that a relation exists between area and authority within the hub.

Figure 11C:
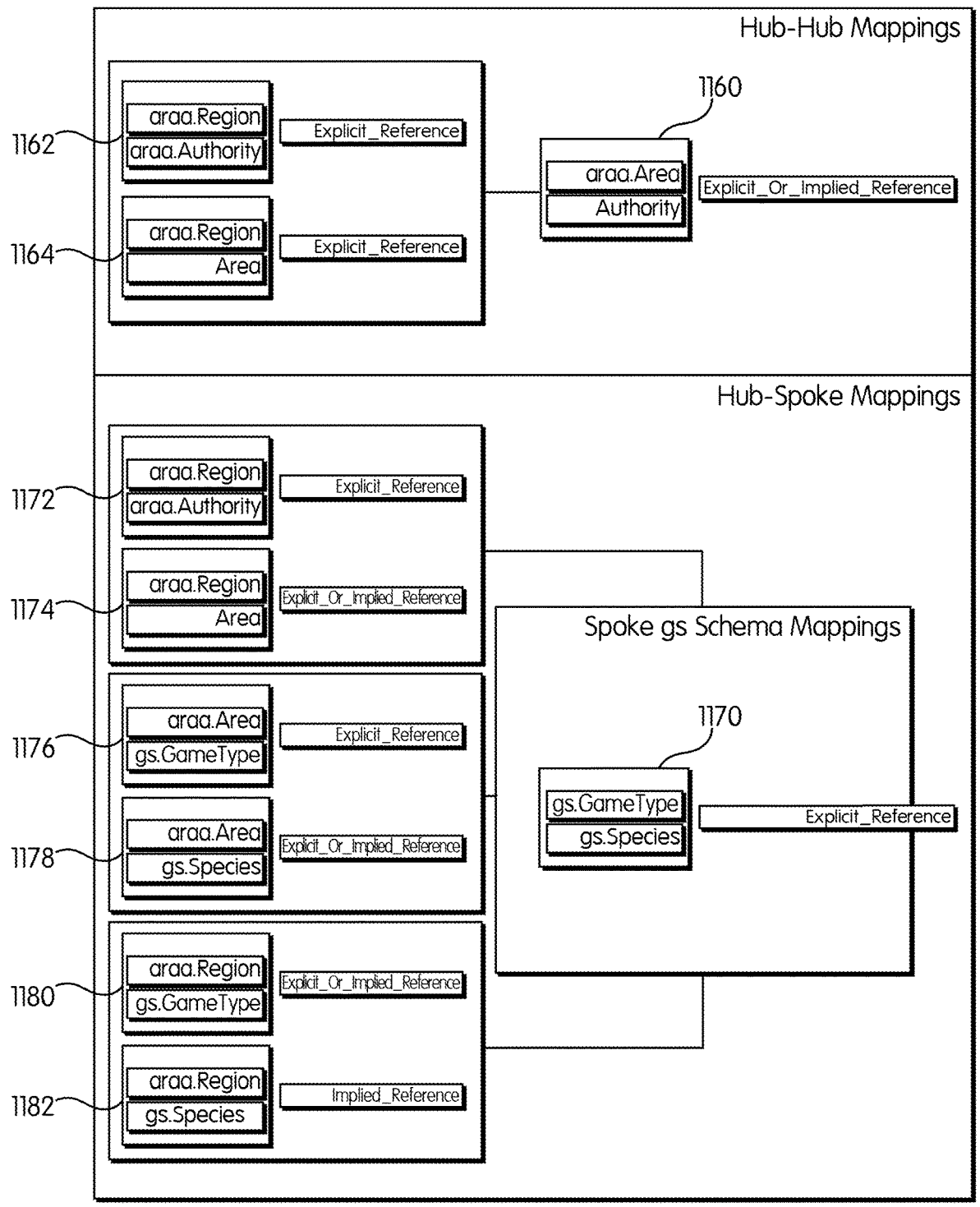

FIG. 11C shows hub-to-hub mappings where the relationships of the hubs are encapsulated. These relationships bring capability to the schema. Hub-to-hub mappings create relationships between a hubs components or between a hub and externally existing components. For example, area and authority are hub components in the farwide.com website example of FIG. 1 and have a relationship that is defined. In FIG. 11C hub mapping 1160 is shown where area is connected to authority, where an area, such as a state, can have one or more authorities from the authority table. The opposite may not necessarily be true. It can be further seen, in mapping 1162 that the hub.region is mapped to the hub.authority and mapping 1164 where the hub.region is mapped to the hub.area. Thus, in the hub-to-hub mapping, a region in the hub has relations to authorities and areas, which in turn are related by way of the region relation.

FIG. 11D shows hub-to-spoke mappings. The relationship between each of the components of the hub, for example activity, region, area, and authority from the example in FIG. 11A can be formed of the mappings in the table 1150. For example, activity of the hub is mapped to game type and also species, both of the spoke. If a client were requesting hunting and a game type of big game, the platform would limit the species available because of the game type/species mapping, which in this case is big game and thus could include elk, mule deer, white-tailed deer, pronghorn, moose, and bear. As shown in FIG. 11D, game type limits species. The reverse does not hold true, since species are common across different game types, such as Rocky Mountain bighorn, desert bighorn, and mountain goat falling into categories of big game and also goats.

In mapping 1170, game type and species are related as spoke-to-spoke mappings. In mapping 1172, hub.activity is related to spoke.game-type through an explicit hub-to-spoke mapping. The effect of the relationships in the mappings 1170 and 1172 is to cause an implied mapping 1174 relation between activity and species. Likewise, a similar effect is caused for mappings 1176 and 1178. Mappings 1180 and 1182 are implied, because the hub-to-hub relationship.

Data can be stored as an object, such as a variable, a data structure, or a function, and as such, is a location in memory having a value and possibly referenced by an identifier. Object can also refer to a particular instance of a class where the object can be a combination of variables, functions, and data structures. In a database, such as a relational database, an object can be a table or column, or an association between data and a database entity, such as relating an area to a species.

It is to be understood that the above-described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The invention claimed is:

1. A computer-implemented method for generating an indexable Uniform Resource Locator (URL) from schema and semantics of an organizational structure comprising:
   defining patterns of possible URL parameters for automatically generating the URL to indicate a hierarchical location of dynamically accessed data within the organizational structure of related content stored in a database, each pattern represented by entities, attributes, and relationships, wherein one or more attributes form organized categories of information and form relationships among one or more entities; and
   dynamically mapping the URL using said patterns to arrange the one or more entities and the one more attributes of the schema to form the URL, along with semantic information about the content in a web page, wherein said semantic information describes a relation between the one or more entities and one or more relational attributes of the one or more entities, and said patterns further limit the one or more entities, wherein a URL parameter of the possible URL parameters is at least one name value pair and correlates the hierarchical location of dynamically accessed data associated with the resource to the content of a web page,
   wherein a web crawler program activates the generated URL causing a web page request from an Internet content provider, a response to the web page request including a web page that matches the content in the generated URL.

2. The method of claim 1, the semantic language associated with part of a pattern and indicating an area of subject matter to be searched and accessed from among the informative data associated with the relational attribute in the database, the subject matter corresponding to the semantic language of a specified URL entered by the user, wherein the subject matter includes an area of interest and an activity.

3. The method of claim 1, further comprising, using the pattern to indicate a level for corresponding semantic data, wherein the level is one of a horizontal or vertical level.

4. The method of claim 1, further comprising, updating a previously received subfield, deleting the previously received subfield, and adding a new subfield.

5. The method of claim 1, wherein the URL can be used to filter the dynamically accessed data for return to a requester and comprises the one or more relational attributes and semantic language.

6. The method of claim 1, further comprising using semantic information to update the data stored in the database.

7. The method of claim 1, wherein the URL further comprises the relational attribute that indicates the hierarchical location of the dynamically accessed data from among a plurality of sources of data stored in the database.

8. The method of claim 1, wherein the relational attribute comprises the pattern of the possible URL parameter within the organizational structure of the data, the pattern representing categories of information and the relationships among them.

9. The method of claim 1, wherein the semantic language indicating an area of subject matter to be searched and accessed from among the data associated with the relational attribute in the database, the subject matter corresponding to the semantic language of a specified URL entered by the user.

10. The method of claim 1, further comprising using the relational attribute to indicate a level for corresponding semantic data.

11. A non-transitory computer readable medium having computer executable instructions thereon for automatically generating a Uniform Resource Locator (URL) from schema and semantics of an organizational structure, said computer executable instructions thereon comprising computer executable instructions for:
   identifying a pattern in a database for automatically generating the URL to indicate a hierarchical location of dynamically accessed data associated with a resource, and semantic information about the resource, using data entries from the database about a requested resource;
   calculating with said pattern to arrange one or more entities and one or more attributes of the schema to form the URL with semantic information about the content in the web page, wherein said semantic information describes a relation between the plurality of entities and one or more relational attributes of the entity, and wherein a URL parameter is at least one name value pair and correlates the hierarchical location of dynamically accessed data associated with the resource to the content of a web page;
   creating a response using data from the database, based on a filter associated with the requested resource, to correlate the hierarchical location of dynamically accessed data to the content of a web page; and
   dynamically mapping the URL using the pattern and the semantic information and transmitting the URL along with the response.

12. The executable instructions of claim 11, further comprising calculating possible URL parameters for automatically generating the URL to indicate the hierarchical location of the dynamically accessed data of the resource within the organizational structure of related content stored in the database, and generating at least one pattern including one or more attributes forming organized categories of information and forming relationships among the one or more entities; and
   dynamically mapping the URL with at least one parameter and the at least one pattern that conveys informative data about the resource.

13. The executable instructions of claim 11, further comprising using the relational attribute to indicate a level for corresponding semantic data,
   transmitting requested updates of the data associated with the URL, the request generated by changing at least one subfield in a data field, to include new semantic information; and
   receiving updated dynamically accessed data, in response to changes determined in the semantic information.

14. The executable instructions of claim 11, the URL further comprising semantic data to filter or update the dynamically accessed data stored in the database.

* * * * *

UNITED STATES PATENT AND TRADEMARK OFFICE
CERTIFICATE OF CORRECTION

PATENT NO. : 11,269,970 B2
APPLICATION NO. : 16/558980
DATED : March 8, 2022
INVENTOR(S) : Steve Raymond It is certified that error appears in the above-identified patent and that said Letters Patent is hereby corrected as shown below:

In the Claims

Column 23, Line 21, Claim 1, delete "one more" and insert -- one or more --

Signed and Sealed this
Fifth Day of July, 2022

Katherine Kelly Vidal
*Director of the United States Patent and Trademark Office*